United States Patent

Amoroso, Jr. et al.

[11] Patent Number: 4,509,050
[45] Date of Patent: Apr. 2, 1985

[54] AUTOMATIC ADAPTIVE SENSITIVITY TIME CONTROL FOR A GROUND MAPPING RADAR

[75] Inventors: Salvatore Amoroso, Jr., Fairfield; Russell W. Conklin, Stratford, both of Conn.

[73] Assignee: United Technologies Corporation, Hartford, Conn.

[21] Appl. No.: 413,007

[22] Filed: Aug. 30, 1982

[51] Int. Cl.³ .............................. G01S 7/34
[52] U.S. Cl. .................. 343/5 SM; 343/7 A
[58] Field of Search ............ 343/5 CM, 5 SM, 7 A, 343/5 CF, 5; 455/296, 305, 303, 306; 328/173, 175; 367/49

[56] References Cited

U.S. PATENT DOCUMENTS

| | | | |
|---|---|---|---|
| 2,894,245 | 7/1959 | Johnson | 367/49 X |
| 3,150,327 | 9/1964 | Taylor | 367/49 X |
| 3,176,293 | 3/1965 | Nolen et al. | 343/7 A |
| 3,231,823 | 1/1966 | Garfield et al. | 455/303 X |
| 3,340,368 | 9/1967 | Wohrab et al. | 328/175 X |
| 3,671,867 | 6/1972 | Schwarz | 455/296 X |
| 3,876,943 | 4/1975 | Watt et al. | 455/305 X |
| 4,045,798 | 8/1977 | Carré | 343/7 A X |
| 4,069,455 | 1/1978 | Sherman, Jr. | 455/296 X |
| 4,189,714 | 2/1980 | Adam | 343/5 SM X |

Primary Examiner—Maynard R. Wilbur
Assistant Examiner—Brian Steinberger
Attorney, Agent, or Firm—Richard P. Lange; Robert P. Sabath

[57] ABSTRACT

An automatic adaptive sensitivity time control for a ground mapping radar comprises the dynamic range of radar returns for presentation on a video display. A feedback loop including a differential amplifier senses the magnitude of a signal presented to a limit amplifier and compares the same with a clutter threshold reference potential. A low-pass filter in the feedback loop then smooths or averages the clutter deviation from the reference potential to adjust the clutter level out of a log IF amplifier so that the nominal clutter signal level of close-in returns does not exceed a predetermined magnitude. A second embodiment includes a dual time constant filter in the feedback loop. A comparator circuit senses the leading edge of clutter return signals and switches the feedback loop to its faster time constant mode allowing dynamic compression of smaller time constant pulses.

4 Claims, 4 Drawing Figures

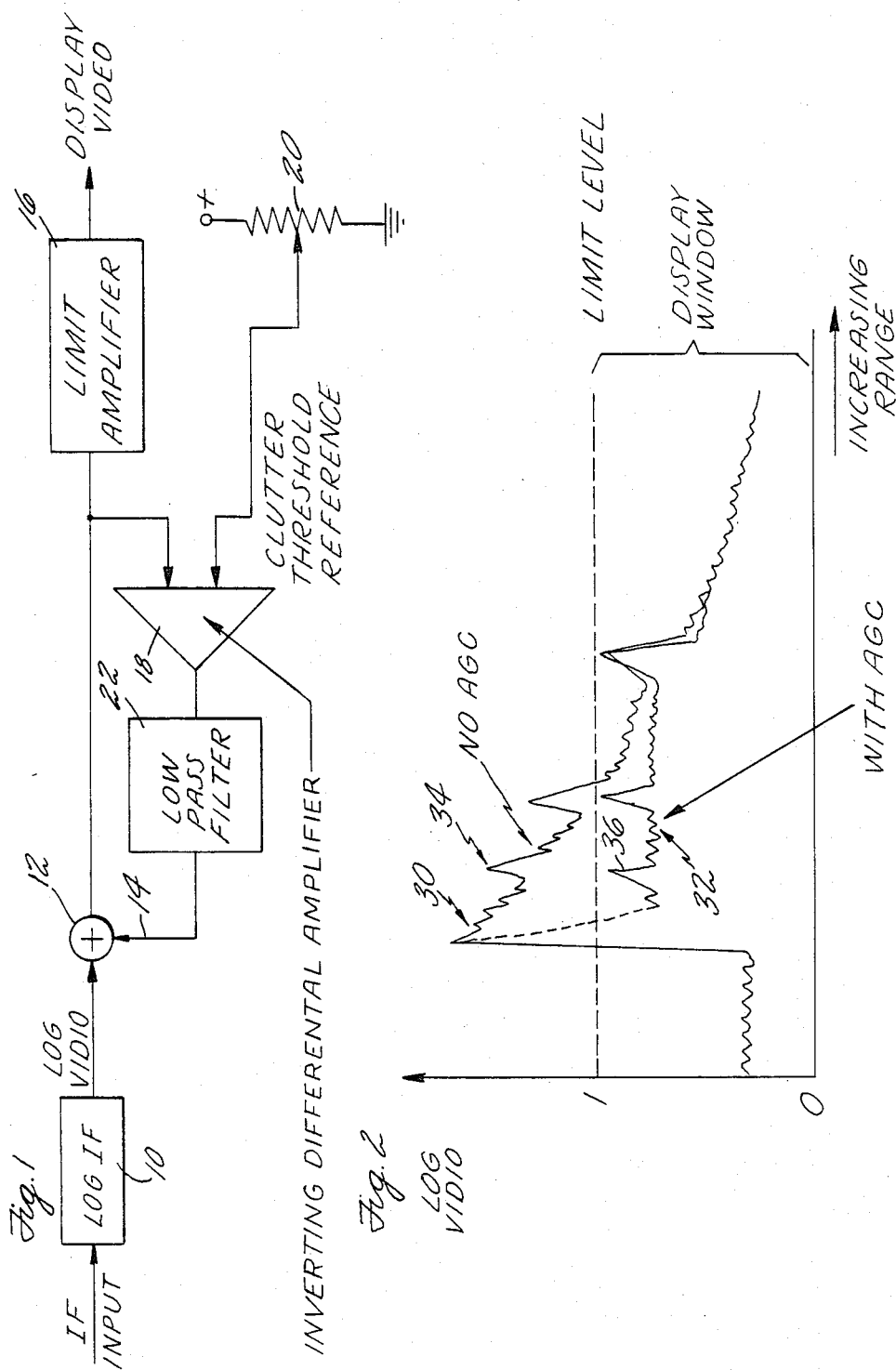

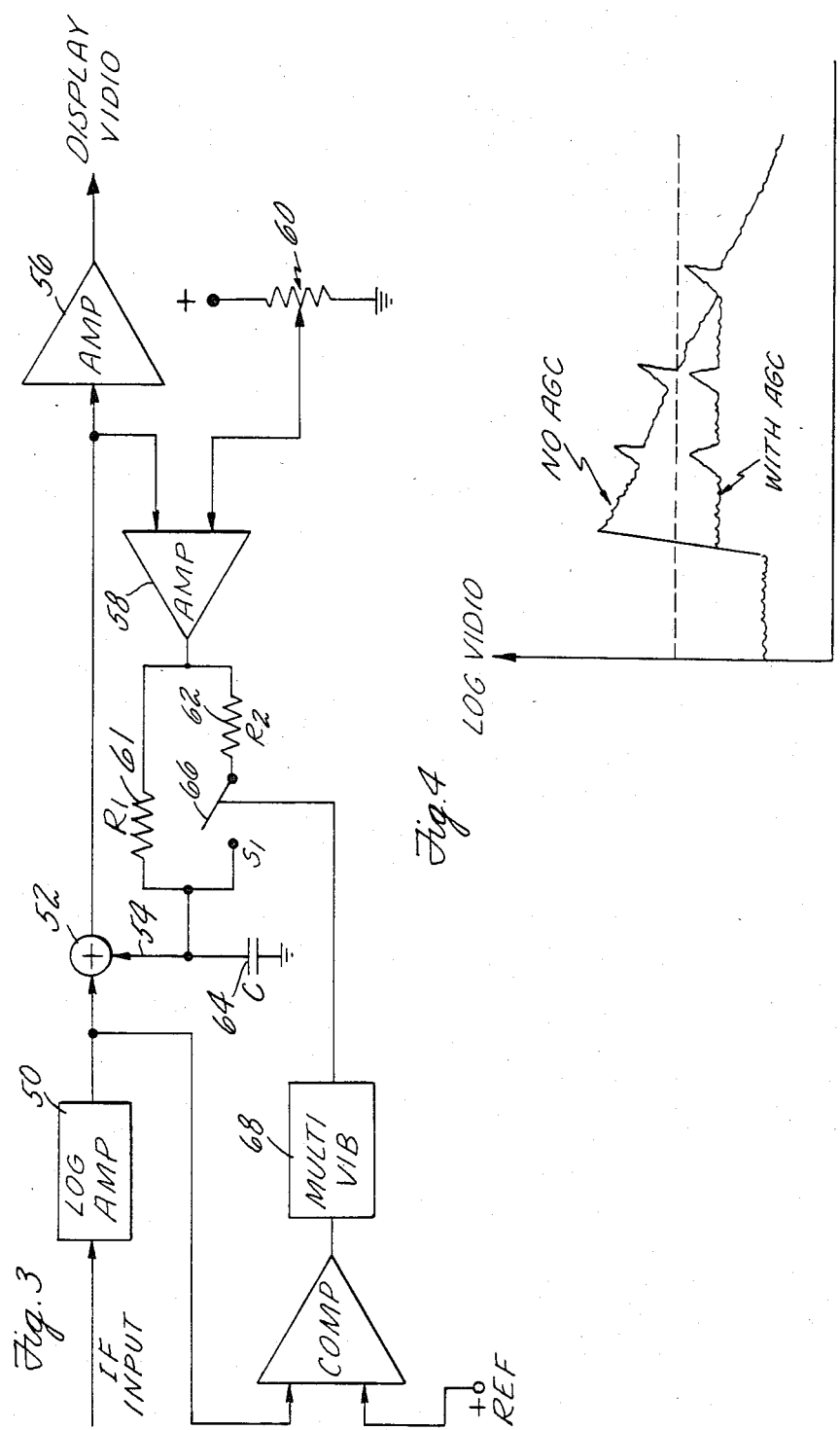

AUTOMATIC ADAPTIVE SENSITIVITY TIME CONTROL FOR A GROUND MAPPING RADAR

The Government has rights in this invention pursuant to Contract No. F-33657-79-C-0416, awarded by the Department of the Air Force.

DESCRIPTION

1. Field of the Invention

This invention relates to a ground mapping radar, and more particularly, to a ground mapping radar which includes an improved dynamic compression circuit to normalize target returns.

2. Background Art

Video displays have been used as a readout device for radar data over many years. One classical problem associated with video displays has been how best to compress the very wide range of radar return signals within the limited dynamic range of a video display. A number of techniques have evolved over the years to handle this problem of dynamic range incompatibility.

The best known dynamic compression technique is probably an automatic gain control. In this technique, an intermediate frequency (IF) gain control element such as an electronically-variable attenuator is used ahead of, or distributed throughout, the post-IF amplifier stages as a part of a feedback loop which performs the automatic gain control (AGC) function. By the appropriate adjustment of the loop time constant, the low frequency ground clutter signals can be attenuated automatically to prevent receiver saturation. Thus, an AGC control prevents the strong near-in ground-clutter returns from saturating the receiver preventing the display of discrete ground targets in this near-in region.

A more recently developed dynamic range compression circuit technique is the logarithmic IF amplifier which is extensively used in radar systems today. One of the problems associated with this wide-dynamic range log amplifier is that the amount of compression required to maintain signal levels within the limited dynamic range of the video display reduces the target-to-clutter ratio and decreases display contrast. Some radar systems include a fast-time-constant (FTC) circuit following the log amplifier in an attempt to compensate for the reduced target-to-clutter ratio of the log amplifier.

Modern, sophisticated surveillance and ground mapping radars often include a combination of features which allow the operator to optimize the display, such features including antenna beam shaping, sensitive time control, fast time constant, log amplifier, and manual gain control. Although a skilled operator could properly set all of these controls to optimize the display over a wide variety of conditions, the mere number of controls and their different functions make optimizing the display extremely difficult.

DISCLOSURE OF THE INVENTION

It is an object of the present invention to disclose an automatic sensitivity time control circuit for use with a radar system which normalizes the radar returns on a video display.

An advantage of the automatic adaptive sensitivity time control for a ground mapping radar is to provide a self-normalizing signal to a video display. A feedback loop senses the signal presented to a limit amplifier and compares the same with a clutter threshold reference potential. A low-pass filter at the output of the differential amplifier in the feedback loop smooths or averages substantially only the clutter deviation from the reference potential to provide a feedback signal into a summing node. This feedback signal adjusts the clutter level out of a log IF amplifier so that the nominal clutter signal level of close-in returns does not exceed a predetermined magnitude.

A second embodiment of the automatic adaptive sensitivity time control for a ground mapping radar includes a feedback loop having dual time constants. Return radar signals are compressed in a wide band log IF amplifier and presented through a summing node to a limit amplifier before presentation to the video display. A dual time constant feedback loop senses the leading edge of the distributed target radar return signals presented to the limit amplifier and compares the same with a clutter threshold voltage. The differences therebetween are presented to a dual time constant RC filter network. At the same time a comparator circuit senses the leading edge of the distributed clutter return signals and triggers a fixed pulsewidth monostable multivibrator to switch the feedback loop to its faster time constant. This allows accurate tracking of the video leading edge.

The foregoing and other objects, features and advantages of the present invention will become more apparent from the following description of preferred embodiments and accompanying drawings.

BRIEF DESCRIPTION OF THE DRAWINGS

FIG. 1 is a drawing in block diagram form, of one embodiment of the automatic adaptive sensitivity time control according to the present invention for use with a ground mapping radar;

FIG. 2 is a graph depicting the operation of the automatic adaptive sensitivity time control circuit shown in FIG. 1, both with and without the feedback loop in operation;

FIG. 3 is a drawing in block diagram form, of a second embodiment of the automatic adaptive sensitivity time control according to the present invention, this embodiment including a dual time constant feedback loop; and FIG. 4 is a graph depicting the operation of the second embodiment of the automatic adaptive sensitivity time control shown in FIG. 2, both with and without the feedback loop.

BEST MODE FOR CARRYING OUT THE INVENTION

Referring initially to FIG. 1 there is seen one embodiment of the sensitivity time control according to the present invention for use with a ground mapping radar to automatically adjust the dynamic range of radar return signals. The incoming radar return signals are presented to a log IF amplifier 10 of conventional design. The transfer function of the log IF amplifier 10 has a transfer function selected to compress the received radar return signals to within a desired output dynamic range. The output from the log IF amplifier 10 is presented to a summing node 12 where it is combined with a feedback signal on the line 14, the characteristics of this feedback signal being described hereinafter. From the summing node 12 the radar return signal is presented to a limit amplifier 16 which has a linear response characteristic for signals received within a preselected range.

A particular feature of the present invention involves a simple feedback loop which essentially enhances the target-to-clutter contrast in the video output signal from the window amplifier 16. The feedback loop includes a differential amplifier 18 which has one input connected to receive the radar signals presented to the limit amplifier 16. The other input is connected to an adjustable potentiometer 20 which provides a fixed voltage to the second input of the differential amplifier 18 to act as a clutter threshold reference. The output from the differential amplifier is presented to a low-pass filter 22 which smooths or averages the feedback signal presented to the summing node 12. This causes the loop time constant to be such that individual or discrete targets (single pulse-width) do not change the level of the feedback loop but the average value of the low frequency clutter component is maintained.

Referring now to FIG. 2, there is seen a graph depicting the enhanced target-to-clutter contrast obtained with the compression of the automatic adaptive sensitivity time control according to the present invention. The ordinant of the graph depicts range while the abscissa shows the instantaneous magnitude of a received IF radar signal, this being shown generally by the waveform 30 (without automatic adaptive sensitivity time control) and the waveform 32 (with automatic adaptive sensitivity time control). A close-in target, such as is illustrated by pulse 34 in waveform 30 and the pulse 36 in the waveform 32, would show no contrast with respect to background clutter without the automatic adaptive sensitivity time control but with this circuit in operation the background clutter is immediately reduced below the saturation level of the receiver so that contrast is restored.

One potential shortcoming of the simplified embodiment of the automatic adaptive sensitivity time control circuit shown in FIG. 1 relates to its response time. A large overshoot, such as would occur at the leading edge of a distributed target, tends to overdrive the input of the limit amplifier 16. This second embodiment of an automatic adaptive sensitivity time control for a ground mapping radar has two loop time constants, e.g., a slow time constant loop and a fast time constant loop. As before, the incoming radar return signals are first presented to a log IF amplifier 50 of conventional design. The transfer function of the log IF amplifier 50 compresses the received radar return signals to a desired dynamic range. The output from the log IF amplifier is presented to a summing node 52 where it is combined with a feedback signal on the line 54, the characteristics of this feedback signal being described hereinafter. From the summing node 12 the radar return signals are presented to a limit amplifier 56 which has a linear response characteristic for signals received within a preselected range.

A particular feature of the present invention involves a dual time constant feedback loop which includes an amplifier 58 having one terminal connected to receive the radar signals presented to the limit amplifier 56. The other terminal of the amplifier 58 is connected to a variable DC voltage source, such as an adjustable potentiometer 60, to act as a clutter threshold reference. The output of the differential amplifier 58 presents the radar return signals to an RC filter comprised of resistor 61, resistor 62 and capacitor 64. The resistor 61 and the resistor 62 are coupled in parallel between the output of the differential amplifier 58 and one side of the capacitor 64. A switch 66 is connected in series with resistor 62 so that it can be connected into or out of the filter network changing the loop time constant of the feedback circuit between its slow and fast time constant modes. The switch 66 is enabled under the control of a simple comparator circuit including an amplifier 56 having one terminal connected to receive the radar return signals at the output of the log IF amplifier 50 and its other terminal connected to a reference potential. The output of the differential amplifier 56 is presented to a monostable multivibrator 68 so that by closing the switch 66 the feedback loop has a faster time constant.

Finally referring to FIG. 4, in operation this allows the feedback loop to follow the leading edge of a radar return signal over a period corresponding to that of the monostable multivibrator. At the end, the time constant of the feedback loop reverts to its slower time constant so that the clutter threshold is unaffected by the return spikes.

Although this invention has been shown and described with respect to preferred embodiments, it will be understood by those skilled in this art that various changes in form and detail thereof may be made without departing from the spirit and scope of the claimed invention.

We claim:

1. An adaptive sensitivity time control for a radar system employing a video display, comprising:
   a log IF amplifier means for receiving radar return signals in a radar system;
   a limit amplifier connected to said log IF amplifier for providing an output signal to a video display, said output signal having a range related to the available contrast in said video display; and
   a feedback loop for sensing the input to said limit amplifier for providing a feedback to a node between said log IF amplifier and said limit amplifier for adjusting the clutter level of radar returns out of said limit amplifier so that the nominal clutter level of close-in radar return signals does not exceed a predetermined magnitude.

2. An adaptive sensitivity time control according to claim 1, wherein said feedback loop includes a differential amplifier having one input connected to sense the input signal presented to said limit amplifier and the other input connected to a variable voltage source which acts as a clutter threshold reference.

3. An adaptive sensitivity time control according to claim 2, wherein the output from said differential amplifier in said feedback loop is presented to a low-pass filter for creating an average clutter level signal which is presented to said summing node.

4. An adaptive sensitivity time control according to claim 2, further including a dual time constant RC filter controlled by a comparator circuit, said comparator circuit sensing the leading edge of radar returns and transitioning said feedback loop between its respective time constant.

* * * * *